United States Patent
Guilbault et al.

(10) Patent No.: US 8,877,089 B2
(45) Date of Patent: Nov. 4, 2014

(54) COMPOSITION FOR CHEMICAL IMPROVEMENT OF SOIL AND ROAD BASE MATERIALS

(75) Inventors: Lawrence James Guilbault, Boxford, MA (US); Christopher Rider, Sandown, NH (US)

(73) Assignee: Christopher Rider, Sandown, NH (US)

( * ) Notice: Subject to any disclaimer, the term of this patent is extended or adjusted under 35 U.S.C. 154(b) by 519 days.

(21) Appl. No.: 12/931,838

(22) Filed: Feb. 11, 2011

(65) Prior Publication Data
US 2012/0207551 A1  Aug. 16, 2012

(51) Int. Cl.
C09K 17/36  (2006.01)

(52) U.S. Cl.
CPC ..................... C09K 17/36 (2013.01)
USPC ........................ 252/88.1; 252/88.2

(58) Field of Classification Search
USPC ...................................... 252/88.1
See application file for complete search history.

(56) References Cited

U.S. PATENT DOCUMENTS

| | | |
|---|---|---|
| 4,649,166 A | 3/1987 | DeFatis |
| 5,000,789 A | 3/1991 | Merritt |
| 5,409,984 A | 4/1995 | Gerhardinger et al. |
| 6,695,545 B2 | 2/2004 | Boston |
| 2010/0247240 A1* | 9/2010 | Vitale .............................. 404/76 |
| 2011/0306713 A1* | 12/2011 | Ueda et al. .................... 524/265 |

FOREIGN PATENT DOCUMENTS

WO   WO 2010/117658 A2   10/2010

OTHER PUBLICATIONS

Maintenance Manual, Pub 23 (7-10), Chapter 6: Unpaved Surfaces, 5 pgs.
How to Build a Sand Clay Road—Highway History—United States Department of Transportation, Federal Highway Administration, http://www.fhwa.dot.gov/infrastructure/how.cfm Oct. 21, 2010, 2 pgs.
The Sand-Clay Roads of South Carolina—Highway History— United States Department of Transportation, Federal Highway Administration, http://www.fhwa.dot.gov/infrastructure/sandlcay. cfm Oct. 21, 2010, 5 pgs.
CSS Technology, Inc., "What is Roadbond EN 1™?", www. RoadbondSoil.com 7 pgs. (unnumbered).

* cited by examiner

*Primary Examiner* — Necholus Ogden, Jr.
(74) *Attorney, Agent, or Firm* — Iandiorio Teska & Coleman LLP

(57) ABSTRACT

A treatment for soils and road base materials including applying to the soil or road base materials an organosilicon waterproofing agent, and applying to the soil or road base material a soil stabilizer binder including an acrylate ester polymer emulsion.

14 Claims, 1 Drawing Sheet

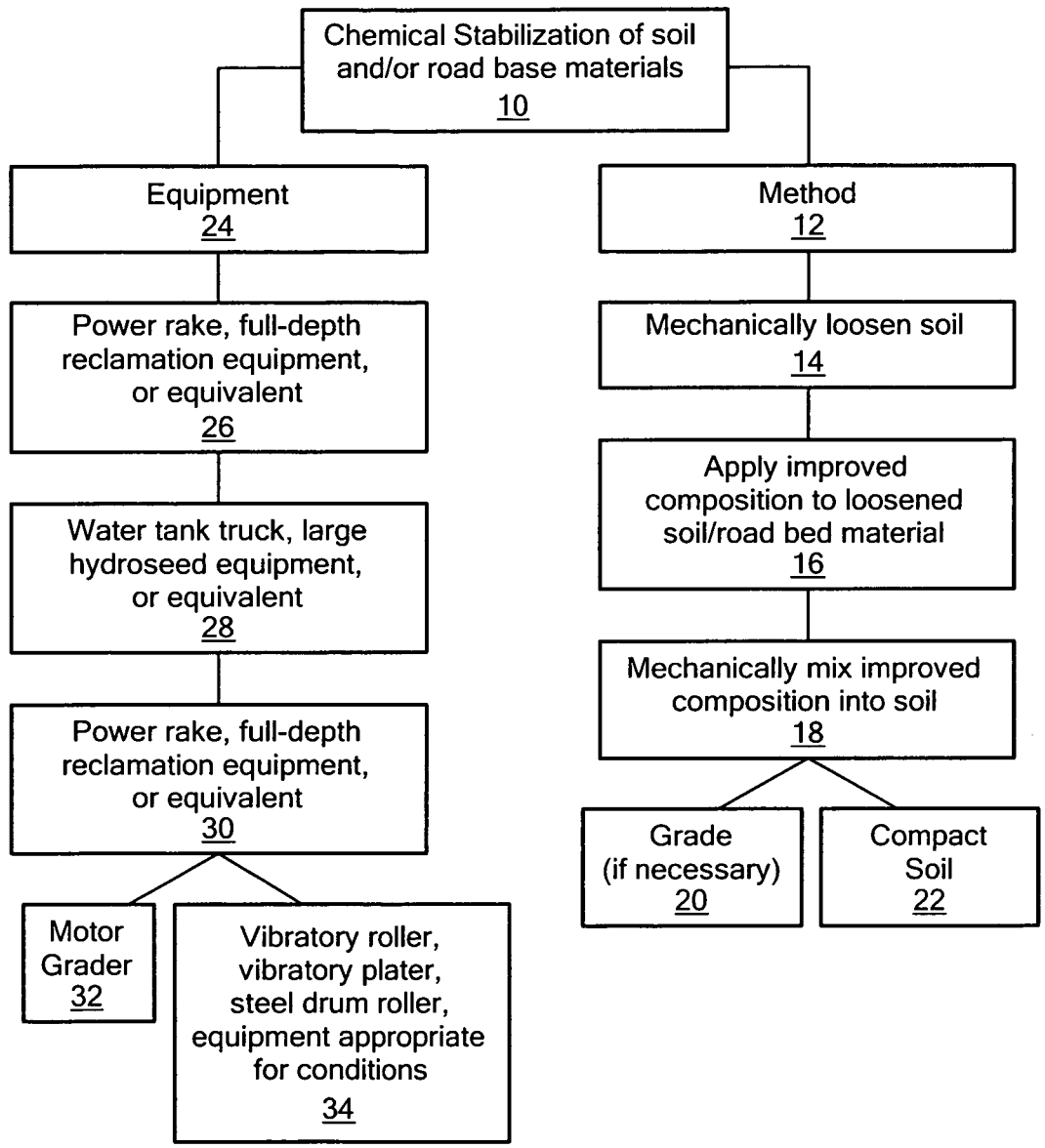

COMPOSITION FOR CHEMICAL IMPROVEMENT OF SOIL AND ROAD BASE MATERIALS

FIELD OF THE INVENTION

This invention relates to an improved composition for chemical improvement of soil and road base materials.

BACKGROUND OF THE INVENTION

Conventional road construction is costly and typically requires replacement of unsuitable sub-soil with suitable aggregate and availability of a source of asphalt or concrete, which materials are not obtainable or affordable in many areas in developing nations and in areas served by secondary (gravel, dust, unpaved) roads. A recent solution uses the in situ soils and mixes them with a soil stabilizer and dust retardant and a waterproofing or water repellant agent to directly make a road surface. One approach uses an aqueous solution of a water repellant such as potassium or sodium methylsiliconate and potassium hydroxide and an aqueous emulsion of a soil stabilizer and dust retardant including polyacrylic acid (PAA) and polyvinyl acetate (PVA). The dust retardant appears necessary to draw moisture from the air to dampen the dust which results from the wear of the treated road surface. One shortcoming of this approach is the limited hardness of the resulting road surface, another is its poor characteristics when exposed to water which can lead to breakdown of the road surface as well as the accumulation of dust which when wet forms a scum-like layer that becomes extremely slippery and a driving hazard. Continuous prolonged exposure to large amounts of water will cause the entire surface to soften to the point of total failure. Related see Vitale, U.S. 2010/0247240 A1.

SUMMARY OF THE INVENTION

It is therefore an objective of this invention to provide an improved composition for chemical improvement of soil and road base materials.

It is a further objective of this invention to provide such an improved composition which creates a stronger road surface.

It is a further objective of this invention to provide such an improved composition which creates a stronger road surface less likely to break down and produce dust.

It is a further objective of this invention to provide such an improved composition which creates a stronger road surface that maintains its superior strength even after prolonged exposure to water.

The invention results from the realization that a truly improved, stronger, more water resistant and more dust free surface can be made by mixing with soil or road bed materials a composition of an organosilicon waterproofing agent and a soil stabilizing binder including an acrylate ester polymer emulsion.

The subject invention, however, in other embodiments, need not achieve all these objectives and the claims hereof should not be limited to structures or methods capable of achieving these objectives.

This invention features a composition for chemical improvement of soil and road base materials including an organosilicon waterproofing agent and a soil stabilizer binder including an acrylate ester polymer emulsion.

In a preferred embodiment the organosilicon waterproofing agent may include a trialkoxysilane. The organosilicon waterproofing agent may include an organosiliconate. The organosiliconate may include an alkyl siliconate. The stabilizer binder may include a styrene/acrylate ester polymer emulsion. The waterproofing agent may be added to the substrate at concentrations in the range of 0.1 to 5.0 percent by weight. The polymer emulsion may be added to the substrate in the concentration range of 0.5 to 5.0 percent polymer solids by weight. The composition may further include aluminosilicate added to the soil or road base material in the concentration range 1.0 to 10.0 percent by weight. The soil or road base materials may include clayey soil, where the clay content ranges from 1% to 100%.

The invention also features a method of treating soils and road base materials including applying to the soil or road base materials an organosilicon waterproofing agent, and applying to the soil or road base material a soil stabilizer binder including an acrylate ester polymer emulsion.

In a preferred embodiment the organosilicon waterproofing agent may include organosiliconate. The organosilicon waterproofing agent may further include trialkoxysilane.

The invention also features a method of treating soils and road base materials including applying to the soil or road base a preformed mixture of an organosiliconate waterproofing agent and a soil stabilizer binder including an acrylate ester polymer emulsion.

In a preferred embodiment the organosilicon waterproofing agent may include organosiliconate. The organosilicon waterproofing agent may further include trialkoxysilane.

BRIEF DESCRIPTION OF THE SEVERAL VIEWS OF THE DRAWINGS

Other objects, features and advantages will occur to those skilled in the art from the following description of a preferred embodiment and the accompanying drawings, in which:

FIG. 1 is a block diagram representing the equipment and procedure for applying the composition according to this invention.

DETAILED DESCRIPTION OF THE INVENTION

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

The improved composition for chemical improvement of soil and road based material includes an organosilicon waterproofing agent and a soil stabilizing binder including an acrylate ester polymer emulsion. The organosilicon waterproofing agent may include an organosiliconate or a trialkoxysilane where three hydrocarbon moieties are bonded to silicon through oxygen. These organosiliconates and trialkoxysilanes have one to 16 carbon atoms in each of the hydrocarbon moieties. The chemical structures of these silicon based waterproofing agents described above are depicted below where R represents a hydrocarbon moiety

| R-Si(O⁻)₃ | R-Si(OR)₃ |
|---|---|
| Alkyl siliconate | Trialkoxy silane |

R—Si(O⁻)₃ R—Si(OR)₃ Alkyl siliconate Trialkoxy silane

The polymer emulsion binder may be an acrylate ester homopolymer or copolymer, and in particular a styrene/acrylate ester copolymer. A single polymer component, an acrylate ester homopolymer or copolymer serves as the polymer binder. Acrylate ester polymers are superior with respect to water sensitivity, bonding capability and weathering resistance. The structure of the functional groups on the acrylate ester polymers is shown below —C(O)—OR
Acrylate ester
(Water insoluble)
(where R = $C_1$ to $C_{16}$)

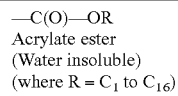

There is shown in FIG. 1 a flow block diagram 10 showing the chemical stabilization of soil and/or road based materials using the improved composition according to this invention. Throughout this application the terms soil and/or road base materials are used but are not to be narrowly interpreted. They apply to all kinds of earthen material, e.g. sand, dirt, rocks, aggregate, gravel. The method 12 of applying the improved composition includes mechanically loosening the soil 14 then applying the improved composition to the loosened soil or road bed material 16 and mechanically mixing the improved composition into the soil 18. The soil is now graded 20, if necessary, and compacted 22. Typically the equipment used includes a power rake or full-depth reclamation equipment, or the equivalent 26 to mechanically loosen the soil. The improved composition is then mixed with water in a water tank truck or large hydroseed equipment, or the equivalent 28 may be used to apply it to the loosened soil. A power rake, full-depth reclamation equipment or equivalent 30 may be used again to mechanically mix the improved composition into the soil and then a motor grader 32, if necessary to smooth the soil and shape the surface. A vibratory roller, vibratory plate, steel drum roller, or other equipment appropriate for compacting 34 may be used for complete compaction of the soil that has been treated with the improved composition.

In order to show the efficacy of the improved composition according to this invention using a soil stabilizer binder including an acrylate ester polymer emulsion as compared with the prior art binders using PAA and PVA a number of tests were performed.

The test aggregate or soil is thoroughly blended with the required amount of emulsion polymer binder and waterproofing agent by hand mixing to obtain a uniform composition. Depending upon the aggregate, additional water may be added to achieve the optimum moisture content and facilitate good mixing and compaction. A 400 gram sample of the thus-treated aggregate or soil is then compacted in a Marshall Hammer device to form 4 inch diameter by 1 inch thick molded specimen "puck" using twenty blows with the four Kg hammer weight and a drop height of 45 cm.

The compacted pucks are allowed to dry/cure for five days at ambient temperature (ca 23 C) prior to strength testing. One puck is tested "dry" and a second is tested "wet" after submerging in water for 24 hours to provide dry and wet puck breaking strength measurements.

Breaking strength is determined by suspending the conditioned pucks by opposing edges in a horizontal plane in a fixture on top of a load cell. A uniformly increasing downward force is applied to the center of the puck with a ⅜ inch diameter flat mandrel (ca. 0.1 sq. in. surface area) mounted in a manually-operated press. The breaking force (in pounds) at which the suspended sample fractures is noted and the breaking strength (in psi) is calculated by dividing the breaking force by the mandrel surface area (0.1 sq. in.)

Example 1 describes the composition and testing of a driving surface prepared by the method of this invention and utilizing granite stone dust.

Bonded granite stone dust pucks were prepared using Silres® 501 Drysoil waterproofing agent (a formulated potassium methylsiliconate product available from Wacker Chemical Corporation) and Acrygen® 41135 polymer binder (a styrene/acrylate ester emulsion polymer available from Omnova Solutions Inc). Duplicate puck samples were prepared as follows:

| Sample | Treatment Process |
|---|---|
| A | Untreated stone dust bonded with 2% polymer solids |
| B | Stone dust pretreated with 0.5% waterproofing agent followed, after drying, by treatment with 2% polymer binder |
| C | Stone dust treated simultaneously with 0.5% waterproofing agent and 2.0% polymer binder. |

Puck Strength Test Results:

| | Puck Breaking Strength (psi) | |
|---|---|---|
| Sample | Dry Puck | Wet Puck |
| A | >3000 | 500 |
| B | >3000 | 900 |
| C | >3000 | 1500 |

This represents that even the untreated stone dust had a dry puck breaking strength of over 3000 psi. The wet puck of untreated stone dust had a breaking strength of 500 psi while the pucks treated with waterproofing agent had increased wet puck breaking strength.

Example 2 utilizes a New Hampshire clay-containing soil.

New Hampshire clay-containing soil pucks were prepared using blends of the waterproofing agent (WPA) and polymer binder (PB) of Example 1, but varying the level of waterproofing agent. Polymer solids remained at 2.0%. Dried pucks were submerged in water for 24 hours prior to measuring breaking strengths and visually examining the broken pucks for water penetration.

| Waterproofing agent Content (% by wt) | Wet Puck Breaking Strength (psi) | Percent Water Penetration |
|---|---|---|
| 0.00 | 300 | 100 |
| 0.18 | 800 | 75 |
| 0.38 | 1700 | 25 |
| 0.58 | 2000 | 10 |
| 0.80 | >3000 | 0 |

Example 2 indicates that as the waterproofing agent content increased from 0 to 0.8 percent by weight, the wet puck breaking strength increased from 300 psi to over 3000 while the percent of water penetration decreased from 100% to 0.

Example 3 utilizes a 20/80 blend of Texas red clay and granite stone dust, comparing two organosilicon waterproofing agents and two polymer binders.

Pucks were prepared from a blended soil comprising 20% Texas red clay and 80% granite stone dust utilizing the methylsiliconate product waterproofing agent and styrene/acrylic polymer binder of Example 1. Also included in the test was a vinyl acetate/ethylene (VAE) copolymer (Vinnapas NW 137, available from Wacker Chemical Corporation) and Zycosoil, a trialkoxysilane waterproofing agent available from Zydex Industries. Compositions evaluated were:

| Sample | Polymer binder (2% as polymer solids) | Waterproofing Agent (0.6% as supplied) |
|---|---|---|
| A | Styrene/acrylic | methylsiliconate |
| B | VAE | methylsiliconate |
| C | Styrene/acrylate ester | trialkoxysilane |
| D | VAE | trialkoxysilane |

Puck Strength Test Results:

| | Puck Breaking Strength (psi) | |
|---|---|---|
| Sample | Dry Puck | Wet Puck |
| A | >3000 | 550 |
| B | 2400 | 500 |
| C | 1600 | 800 |
| D | 1300 | 500 |

The dry puck breaking strength was over 3000 psi for a styrene/acrylate ester binder with a methylsiliconate water proofing agent while the wet puck breaking strength was 550 psi. Using the same binder with the trialkoxysilane waterproofing agent the dry puck breaking strength was 1600 psi while the wet puck breaking strength was 800 psi. In samples B and D using vinyl acetate/ethylene (VAE) the results were poorer in each case, relative to the styrene/acrylate ester binder.

Example 4 utilizes a 50/50 blend of Texas red clay and granite stone dust as substrate.

Pucks were prepared from a blended soil comprising 50% Texas red clay and 50% granite stone dust using the polymer binder of Example 1 and the waterproofing agents of Example 3. Compositions evaluated were:

| Sample | Waterproofing agent (0.6% as supplied) |
|---|---|
| A | None |
| B | Methylsiliconate |
| C | Trialkoxysilane |

Puck Strength Test Results:

| Sample | Wet Puck Breaking Strength (psi) |
|---|---|
| A | 0 (sample disintegrated upon water immersion) |
| B | 50 |
| C | 200 |

The trialkoxysilane shows a fourfold increase in breaking strength over methylsiliconate.

Example 5 demonstrates various chemical treatment sequences that can be utilized in the method of this invention Pucks were prepared from a blended soil comprised of 20% Texas red clay and 80% granite stone dust using the waterproofing agent and polymer binder of Example 1, but varying the treatment sequence as shown below:

| Sample | Treatment Sequence |
|---|---|
| A | Waterproofing agent alone |
| B | Polymer binder alone |
| C | Simultaneous treatment with WPA/PB blend |
| D | WPA treatment followed by PB after 30 minute hold |
| E | WPA treatment followed by PB after 24 hour hold |

Puck Strength and Puck Water Absorbance Results:

| | Puck Breaking Strength (psi) | | Puck Water |
|---|---|---|---|
| Sample | Dry Puck | Wet Puck | Absorbance (%) |
| A | 400 | <100 | 2.7 |
| B | >3000 | 100 | 6.9 |
| C | >3000 | 750 | 3.4 |
| D | >3000 | 550 | 3.5 |
| E | >3000 | 350 | 4.7 |

While the waterproofing agent may be applied before or after the polymer binder according to this invention, this test indicates clearly that simultaneous treatment with both blended together at the same time provides the best results.

Example 6 provides a comparison of the process and composition of this invention with that described in the prior art (US 2010/0247240 A1). For this comparative example, duplicate pairs of pucks were prepared and tested as described above. The soil composition employed was a 20/80 blend of Texas red clay and granite stone dust. Duplicate pucks were treated with each of the compositions described below and allowed to dry at ambient temperature for five days before dry and wet puck strength testing.

For the prior art composition the waterproofing agent included Silres® 501 Drysoil (a formulated product comprising 1-5% potassium hydroxide and 10-30% potassium methylsiliconate in water, available from Wacker Chemical Corporation) at a treat level of 0.6% by weight based on soil and a one-to-one soil stabilizer and dust retardant blend of polyvinyl acetate emulsion polymer (Pace 387, available from Forbo Adhesives LLC) and polyacrylic acid (available from Manufacturer Chemicals) at a treat level of 2.0% polymer solids based on soil. For the composition of this invention, the composition of Example 3(A) was employed.

Test Results

The wet puck test was done after a 24 hour submersion.

Dry and wet puck strength data is presented below:

| Sample Composition | Puck Breaking Strength (psi) | |
|---|---|---|
| | Dry Puck | Wet Puck |
| This invention | >3000 | 400 |
| Prior Art | 1500 | 300 |

The two-fold improved dry strength of the composition of this invention over the prior art is apparent. Wet puck strength also shows improvement.

Examination of the surface of the wet pucks after 24 hour submergence in water revealed a slimy sludge-like coating on the prior art sample puck that scraped off easily and would not be acceptable as a driving surface. It is believed that this slimy layer formation is due to the water sensitivity of the polyvinyl acetate soil stabilizer and water solubility of the polyacrylic acid dust retardant used in the prior art composition. This results in a slippery surface making for hazardous driving conditions.

In contrast, the surface of the wet puck comprising the composition of this invention remained unchanged upon water exposure due, it is believed, to the superior water resistance (hydrophobicity) of the styrene/acrylate ester polymer binder. The improved composition of this invention works on the full range of the American Association of State Highway and Transportation Officials (AASHTO) soil classification system from A-1 through A-7 and is especially effective on the silt-clay materials in the A-4 through A-7 classifications which historically have been unusable for road construction.

Example 7 provides an additional comparison of the process of this invention with that described in the prior art US Patent application US2010/0247240 A1.

In this example, a pair of pucks representing the two compositions was prepared exactly as described in Example 6 and subjected to water immersion followed by wet puck strength testing.

In the present example however, the pucks were submerged for 89 hours (vs. 24 hours in Example 6) to simulate driving surface exposure to prolonged water contact.

Test Results

Wet puck strength data after 89 hours water exposure is presented below:

| Sample Composition | Puck Breaking Strength (psi) Wet Puck |
|---|---|
| This invention | 300 |
| Prior Art | 50 |

The composition of this invention produced a six-fold strength improvement over the prior art.

The puck surface of the sample prepared using the composition of this invention showed no signs of softening or degradation after this extended water exposure and the water in the test container remained clear and sediment-free.

By contrast, the surface of the puck prepared using the prior art composition revealed a slimy sludge-like coating and the surface was easily gouged with a fingernail. The water in the test container was cloudy with appreciable sediment present due to degradation of the puck composition.

The improved composition according to this invention may further include an aluminosilicate product such as Portland cement for enhancing drying and added strength.

In one practical application the native materials comprised a base and a sub-grade of high clay content silty sand while the aggregate employed consisted of ¾"—crushed river rock with a linear gradation and 25% passing 100 sieve or smaller. The sub-grade and base material were treated with an agent to be sure that the sub-grade had adequate hydrophobicity prior to the application of the treated road surface aggregate or soil. The road surface soil was initially dry blended with a formulated aluminosilicate product such as Portland cement, for example, at a treat level of ½ lb per square foot using an agricultural lime spreader and a power rake to assure good blending. Then an aggregate treatment liquid was formulated from the improved composition by mixing together eighteen parts of acrylate ester copolymer emulsion, one part waterproofing agent, such as potassium methylsiliconate or a trialkoxysilane water proofing agent and twenty-seven parts water. The liquid mixture was blended into an aggregate appropriate for road building at a rate sufficient to achieve optimum moisture content in the material. In this example the aggregate used for the road surface required approximately thirty-one gallons of the improved composition liquid mixture per cubic yard of aggregate. Immediately after treatment the road surface was compacted with a vibratory steel drum roller. With good compaction the roadway was ready for normal traffic the next day. The road surface was as smooth as a typical asphalt or concrete road and has proven to be stronger than asphalt. After seven months it remains, smooth, hard, and durable and still shows no signs of wear from normal traffic and no surface dust whatsoever. Testing the strength of the surface by extreme acceleration of a motor vehicle produced rubber marks on the surface but no deterioration, no dusting, no spalling and no detectable wear.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A method of treating soils and road base materials comprising:
    applying to the soil or road base materials an organosilicon waterproofing agent, and
    applying to the soil or road base material a soil stabilizer binder including an acrylate ester polymer emulsion.

2. The method of claim 1 in which said organosilicon waterproofing agent includes organosiliconate.

3. The method of claim 2 in which said organosilicon waterproofing agent further includes trialkoxysilane.

4. A method of treating soils and road base materials comprising:
    applying to the soil or road base a preformed mixture of an organosiliconate waterproofing agent and a soil stabilizer binder including an acrylate ester polymer emulsion.

5. The method of claim 4 in which said organosilicon waterproofing agent includes organosiliconate.

6. The method of claim 5 in which said organosilicon waterproofing agent further includes trialkoxysilane.

7. The method of claim 1 in which said soil stabilizer binder includes a styrene/acrylate ester polymer emulsion.

8. The method of claim 1 in which said polymer emulsion is in the concentration range of 0.5 to 5.0 percent polymer solids by weight.

9. The method of claim 4 in which said soil stabilizer binder includes a styrene/acrylate ester polymer emulsion.

10. The method of claim 4 in which said polymer emulsion is in the concentration range of 0.5 to 5.0 percent polymer solids by weight.

11. The method of claim 1 including forming a driving or road surface by said applying to and mixing with the soil or road base materials an organosilicon waterproofing agent and said applying to and mixing with the soil or road base material a soil stabilizer binder including an acrylate ester polymer emulsion.

12. The method of claim 4 including forming a driving or road surface by said applying to and mixing with the soil or road base a preformed mixture of an organosiliconate waterproofing agent and a soil stabilizer binder including an acrylate ester polymer emulsion.

13. The method of claim 11 further including grading and compacting the road surface.

14. The method of claim 12 further including grading and compacting the road surface.

* * * * *